United States Patent

Lanz

Patent Number: 5,971,033
Date of Patent: Oct. 26, 1999

[54] PROFILED TUBE, CORRUGATED HOSE OR THE LIKE ELONGATE PORTION WITH MUTUALLY PARALLEL PERIPHERAL GROOVES

[76] Inventor: Werner Lanz, Lindenstrasse 14, 8737 Gummiswald, Gummiswald, Switzerland

[21] Appl. No.: 08/837,015

[22] Filed: Apr. 11, 1997

[30] Foreign Application Priority Data

Apr. 12, 1996 [DE] Germany ............ 296 06 620 U
Sep. 5, 1996 [DE] Germany ............ 196 35 986

[51] Int. Cl.$^6$ .................................. F16L 11/15
[52] U.S. Cl. ............... 138/121; 138/177; 138/DIG. 11
[58] Field of Search ........................ 138/121, 122, 138/119, 177, DIG. 11, 38, 135, 150, 154; D23/266

[56] References Cited

U.S. PATENT DOCUMENTS

| | | | |
|---|---|---|---|
| D. 24,439 | 6/1895 | Ledward | D23/266 |
| 1,758,495 | 5/1930 | Boyd | 138/38 |
| 3,041,855 | 7/1962 | Hanlein | 138/135 |
| 3,559,692 | 2/1971 | Mantelet . | |
| 4,562,733 | 1/1986 | Kant | 138/122 |
| 4,650,138 | 3/1987 | Grose | 138/38 |
| 4,690,174 | 9/1987 | Järvenkylä | 138/121 |
| 4,759,389 | 7/1988 | Woo Suck | 138/154 |
| 4,904,113 | 2/1990 | Goddard et al. | 138/121 |
| 4,976,289 | 12/1990 | Umemori et al. | 138/122 |

*Primary Examiner*—James F. Hook
*Attorney, Agent, or Firm*—Bachman & LaPointe, P.C.

[57] ABSTRACT

In a profiled tube, corrugated hose or the like elongate portion of flexible material with mutually parallel peripheral grooves (20) and ridge rings (12) laterally delimiting same the peripheral grooves (20) are radially prolonged in the groove center (N) extending transversely to the longitudinal axis (A) of the elongate portion (10), by at least one recess (20$_a$), forming a shoulder step (18), wherein the width (f) of a land ring (16) delimiting the recess towards the longitudinal axis is less than the groove width (i). The depth (q) of the groove recess (20$_a$) is to approximately correspond to half the groove width (i). In addition there can be provided at least two groove recesses (20$_a$) which are disposed on a common radial axis (M) and which each form a respective shoulder step (18).

11 Claims, 1 Drawing Sheet

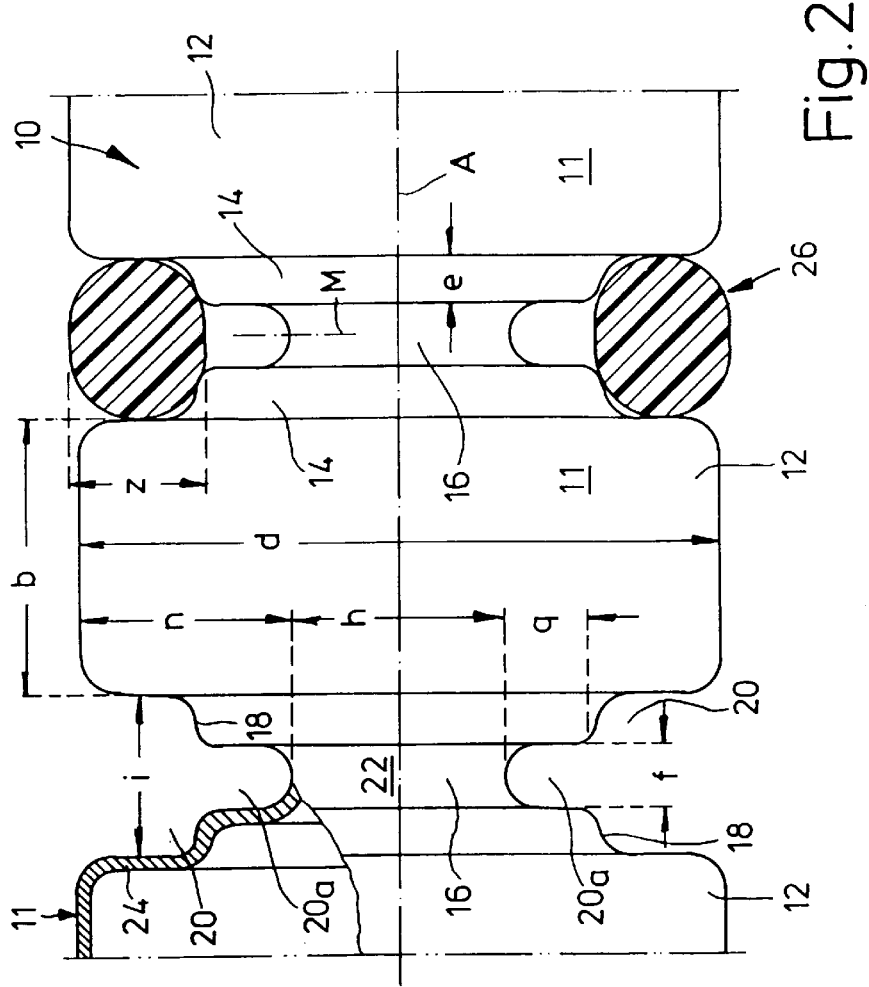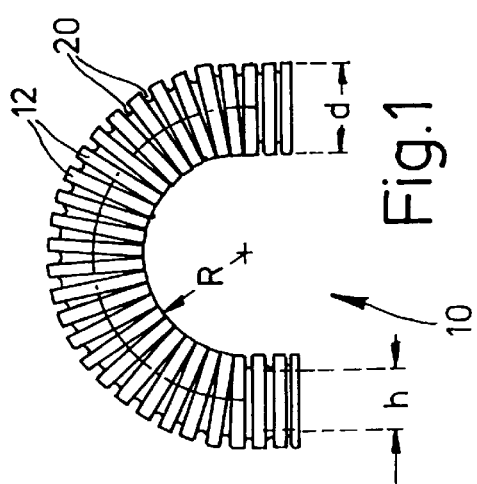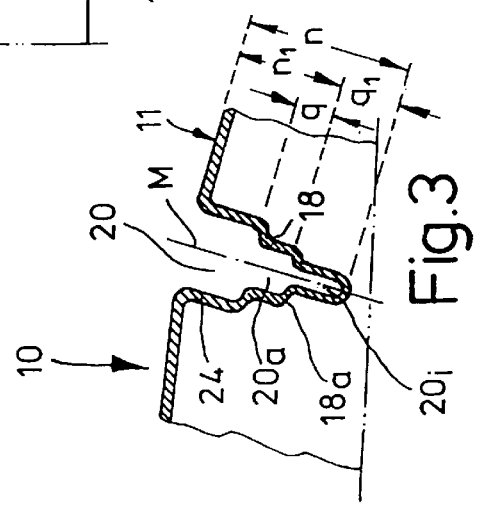

PROFILED TUBE, CORRUGATED HOSE OR THE LIKE ELONGATE PORTION WITH MUTUALLY PARALLEL PERIPHERAL GROOVES

The invention concerns a profiled tube, a corrugated hose or the like elongate portion of flexible material with mutually parallel peripheral grooves and ridge rings laterally delimiting same.

Flexible profiled tubes of that kind serve for installation purposes and are predominantly used in electrical engineering for protecting electric lines, in a special profiled tube configuration with sealing means as an air tube in the pneumatic art or for transporting liquid media, for example water. They are connected together by fittings which each have a substantially cylindrical wall into which the corrugated hose or the like is introduced.

A connecting element having a support ring in the form of a sliding sleeve comprising an abutment ring, an axial inner ring arranged at a spacing relative thereto, lands connecting the abutment ring and the inner ring, and limbs which extend from the inner ring to the abutment ring and which have locking claws towards the corrugated tube is disclosed for example in EP 0 465 896 A1. The corrugated tube thereof is provided with peripheral grooves of a substantially square cross-section which widens slightly in an outward direction. Accordingly the ring-like projection portions extending between the outer grooves, of about equal axial width, are also of slightly outwardly tapering cross-sections. A similar system is disclosed in German patent specification No 39 40 114.

When corrugated hoses and their connecting elements are assembled together, sealing O-rings are introduced into the peripheral grooves.

With knowledge of that state of the art the inventor set himself the aim of so designing peripheral grooves on elongate portions as referred to in the opening part of this specification, that the mounting of the O-rings therein is improved. In that respect the inventor seeks to provide that it is possible to use commercially available O-rings. The inventor further seeks to provide that the corrugated hose or the like elongate portion is to enjoy a high level of alternating flexural strength.

That object is attained by the independent claim; the appendant claims set forth desirable configurations.

In accordance with the invention the peripheral groove is radially enlarged in the groove center which extends transversely to the longitudinal axis of the elongate portion, by at least one recess, forming a shoulder step at both sides, wherein the width of a land ring of the elongate portion, the ring delimiting the recess towards the longitudinal axis, is less than the groove width. In that respect it has been found advantageous for the depth of the groove recess to approximately correspond to half the groove width.

Preferred groove configurations afford a plurality of stepped groove recesses—in particular two thereof—, the centers of which are disposed on a common radial axis. The depths of the two groove recesses can be approximately equal.

In accordance with a further feature of the invention a collar ring is to be formed out of the end wall of the ridge ring; two adjacent collar rings are connected by the above-mentioned land ring. Advantageously the collar rings form those shoulder steps which delimit the peripheral groove towards the longitudinal axis of the elongate portion and between which the recess extends.

Those features afford a peripheral groove of a particular configuration, which extends in a step-like cross-section. Their pairs of lateral shoulder steps serve as supports for the O-ring which can be supported along the shoulder edges and which can fit snugly into the central recess.

That configuration permits an unlimited land height and groove width and results in optimization of those two parameters with respect to the bending radii of the elongate portion.

Centering for cutting to length, in accordance with the respective function to be performed, is also possible in a beautifully simple manner.

Aspects of particular significance are given relationships of the dimensions involved, for example the choice of the land ring diameter which approximately corresponds to a third of the outside diameter of the elongate portion, or the ratio of the depth of the recess to the total groove depth of 0.2 to 0.6—preferably 0.4. The ratio of the groove width to the width of the ridge ring is preferably to be between 0.4 and 0.8, in particular 0.6.

By virtue of the foregoing features, the result afforded is a structure which attains the object envisaged by the inventor in an impressive manner and provides a flexible and fluid-tight installation tube which can be used as a JP 67/JP 68-electrical tube.

Further advantages, features and details of the invention are apparent from the following description and preferred embodiments and with reference to the drawing in which:

FIG. 1 is a side view of a curved corrugated tube,

FIG. 2 is a partly sectional side view of an enlarged portion of a corrugated tube, and FIG. 3 is a diagrammatic view of a part of a longitudinal section of another embodiment.

A corrugated hose 10 of circular cross-section, comprising material of limited elasticity such as polyamide comprises ridge-like rings 12 of a width b by way of example of 7 mm with an outside diameter d of 16 mm, collar rings 14 of a width e adjoining the ridge rings 12, and land or leg rings 16 of a width f of 1.6 mm in this case, which connect each two adjacent collar rings 14. The narrowest outside diameter h of each leg ring 16 measures 5.3 mm here.

As shown in FIG. 1 the corrugated hose 10 can be curved with a bending radius R until the ridge rings 12 are in contact with each other at the inside.

The adjacent collar rings 14—which produce shoulder steps 18 in cross-section—of two ridge rings 12 which extend around the axis A of the corrugated hose delimit a peripheral groove 20 of a groove width i of 4.3 mm; the peripheral groove 20 is extended towards the center M of the land ring 16 connecting the collar rings 14 by a groove recess $20_a$ which is laterally defined by the collar rings 14 and towards the axis A of the corrugated hose by the land ring 16. The total groove depth n is approximately 5.35 mm.

The spacing of the land surface 22—which curves outwardly on both sides of the land center M forming a radial axis—relative to the two shoulder steps 18 afforded by the collar portions 14, or the depth q of the recess $20_a$, measures 2.1 mm here, and therefore corresponds to approximately half the groove width i. The latter are rounded in cross-section towards the ridge ring end wall 24. That configuration of the peripheral groove 20 with its central recess $20_a$ affords a secure seat for a fitted O-ring 26 of a diameter by way of example at z. That diameter z is slightly greater than the groove width i.

The O-ring 26 is braced on the shoulder steps 18 and also fits snugly into the recess $20_a$.

As stated above the specified dimensions are by way of example and are suitably altered for line diameters z of 1:1.5; 1.78; 2 mm etc. Preferred outside diameters d measure for example between 21 and 54 mm with inside diameters h of between 16 and 48 mm.

In the embodiment in FIG. 3 the peripheral groove 20 is provided with two groove recesses $20_a$, $20_i$ which decrease in width towards the axis A of the corrugated hose, that is to say radially, forming two pairs of shoulder steps 18 and $18_a$. Here the dimension of the total groove depth n of the embodiment of FIG. 2 corresponds to the spacing $n_l$ of the inner shoulder step $18_a$ from the ridge ring surface 11; the total groove depth n is here prolonged by the depth $q_l$ of the inner groove recess $20_i$. The longitudinal dimensions of the depths q and $q_l$ approximately correspond to each other here; possibly the depth q of the outer groove recess $20_a$ can be somewhat shorter than the depth $q_l$ of the inner groove recess $20_i$.

I claim:

1. An elongated, corrugated tubular member of flexible material having a longitudinal axis A comprises a plurality of parallel peripheral grooves alternating with a plurality of rings wherein the rings have opposed substantially parallel sidewalls which define the plurality of grooves wherein the grooves have a center line extending transversely to the longitudinal axis A, each groove comprises a stepped groove having at least an upper portion of width i and a lower portion of width f defined by the substantially parallel sidewalls wherein i is greater than f, the opposed substantially parallel sidewalls are provided with at least one shoulder portion for defining a transition between the upper portion and the lower portion of the stepped groove wherein opposed collar rings on the opposed sidewalls form the at least one shoulders and the opposed collar rings are connected by a land ring which forms a bottom of the stepped groove.

2. A tubular member according to claim 1 wherein the lower portion of the stepped groove has a depth q which is about one-half width i of the upper portion.

3. A tubular member according to claim 2 wherein the ring has a width b and the ratio i/b is between about 0.4 to 0.8.

4. A tubular member according to claim 3 wherein the ratio is 0.6.

5. A tubular member according to claim 1 wherein the groove further includes an intermediate portion is located between the upper portion and lower portion and the sidewalls are provided with two shoulder portions for defining the transitions between the upper portion, the intermediate portion, and the lower portion.

6. A tubular member according to claim 5 wherein the depth of the lower portion and the intermediate portion are substantially equal.

7. A tubular member according to claim 5 wherein the stepped groove has a depth N and the ratio q/N is between about 0.2 to 0.6.

8. A tubular member according to claim 7 wherein the ratio is 0.4.

9. A tubular member according to claim 1 wherein the opposed collar rings define the lower portion of the stepped recess.

10. A tubular member according to claim 1 wherein the land ring has a diameter h equal to about one-third the diameter d of the ring.

11. A tubular member according to claim 10 wherein d is between about 21 mm to 54 mm and h is between about 16 mm to 48 mm.

* * * * *